(12) United States Patent
Ilnicki et al.

(10) Patent No.: US 7,710,885 B2
(45) Date of Patent: May 4, 2010

(54) ROUTING MONITORING

(75) Inventors: Slawomir K. Ilnicki, Los Altos Hills, CA (US); Lance A. Tatman, Fremont, CA (US); Alexander L. Tudor, Mountain View, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 1970 days.

(21) Appl. No.: 10/652,286

(22) Filed: Aug. 29, 2003

(65) Prior Publication Data

US 2005/0047413 A1 Mar. 3, 2005

(51) Int. Cl.
*H04L 12/26* (2006.01)

(52) U.S. Cl. ............ 370/241; 370/392; 370/384; 370/252; 370/254; 709/224

(58) Field of Classification Search ............ 370/392
See application file for complete search history.

(56) References Cited

U.S. PATENT DOCUMENTS

| | | | |
|---|---|---|---|
| 6,157,644 A * | 12/2000 | Bernstein et al. | 370/392 |
| 6,421,319 B1 | 7/2002 | Iwasaki | |
| 2002/0131369 A1 * | 9/2002 | Hasegawa et al. | 370/241 |
| 2002/0141378 A1 * | 10/2002 | Bays et al. | 370/351 |
| 2002/0163934 A1 * | 11/2002 | Moore et al. | 370/465 |
| 2003/0037136 A1 * | 2/2003 | Labovitz et al. | 709/224 |
| 2004/0196841 A1 | 10/2004 | Tudor et al. | |
| 2005/0064820 A1 * | 3/2005 | Park et al. | 455/67.11 |
| 2006/0083511 A1 * | 4/2006 | Edmunds et al. | 398/25 |

FOREIGN PATENT DOCUMENTS

| EP | 1289191 | 3/2003 |
|---|---|---|
| WO | 02 46947 | 6/2002 |

OTHER PUBLICATIONS

Fujinaga, Mashiko; Hotta, Takao; Asami, Tohru; "A Tool for Monitoring Routing Information in the Internet", 1999, Proceedings of the 1999 International Workshops on Parallel Processing, pp. 274-279.*
EP Search Report dated Nov. 3, 2006.
Yuka Kamizuru and Yoshiji Amagai—"Distributed Inter-AS Route Monitor—Distributed Internet Route Eye (DIRE)"; Parallel And Distributed Systems, 1998; Proceedings, 1998; International Conference on Tainan, Taiwan, Dec. 14-16, 1998, Los Alamitos, CA, USA, IEEE Comp. Soc., US; Dec. 14, 1998; pp. 533-540; XP010318667.

* cited by examiner

*Primary Examiner*—Rafael Pérez-Gutiérrez
*Assistant Examiner*—German Viana Di Prisco

(57) ABSTRACT

A routing monitor is disclosed comprising at least one communication tap, wherein each of the at least one communication taps is positioned in a line of communication between two routers and a protocol emulator for reassembling routing protocol messages captured by the at least one communication tap and opening a routing protocol connection with a network device using the reassembled routing protocol messages in response to a request for connection received from the network device.

26 Claims, 2 Drawing Sheets

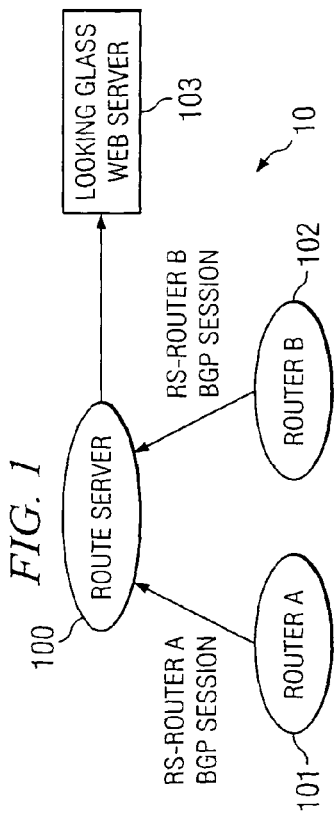
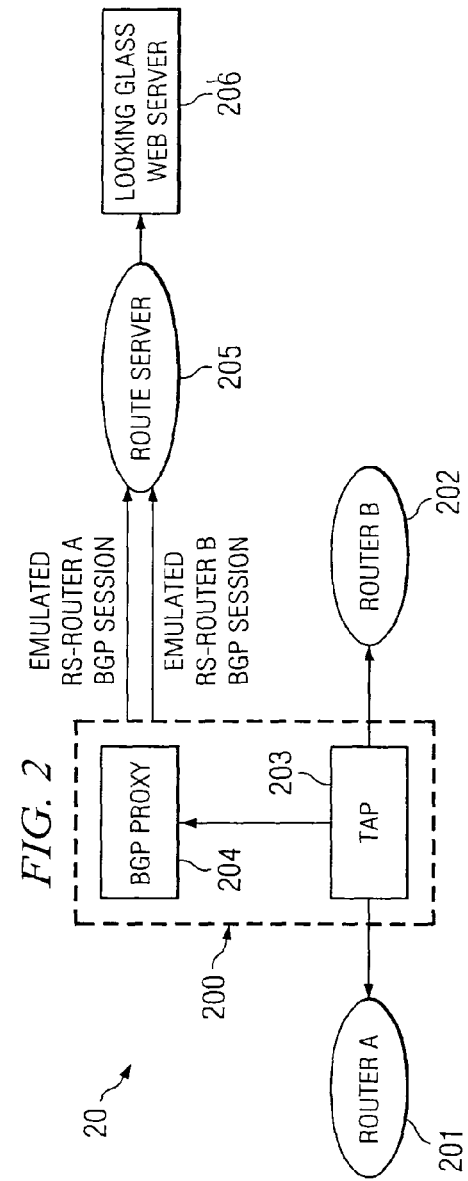

ROUTING MONITORING

TECHNICAL FIELD

The present invention relates, in general, to network management and, more particularly, to routing monitoring.

BACKGROUND OF THE INVENTION

Local Area Networks (LANs), Wide Area Networks (WAN), and the Internet connect businesses and people across the world. Networks typically use routers to route data to the nodes or connection points of the network. Routers are generally specialized computers that forward messages to their respective destinations along many possible pathways via, what the router may calculate as, an effective and efficient route. As traffic increases, congestion may develop along any one or several such possible routes, communication links go down or routers may fail. The router may then change preferred routing schemes to accommodate the congestion or network failures (dead communication link or router).

Routers generally have input and output ports, for receiving and sending messages/packets, a switching fabric of some kind, and a routing processor. During operation, the routing processor controls routing hardware/software processes that examine the header information of the message/packet and find the address where the data is being sent. The router will then generally compare the network address against an internal database of addresses, known as a routing table, that maintains a list of possible routes to that destination address. Based on the particular Internet Protocol (IP) address to which the message/packet is addressed, the message/packet is sent to the destination, whether the destination is the final destination or whether it is the next router in the destination path.

The routers within a particular autonomous system (AS) may exchange routing information internally (i.e., intra-domain routing) using any one of a variety of accepted routing protocols, such as Routing Information Protocol (RIP), Open Shortest Path First protocol (OSPF), Intermediate System to Intermediate System (ISIS), or the like. Routers that participate in inter-domain routing (i.e., routing information exchanged between different domains or AS) typically exchange information using Border Gateway Protocol (BGP). BGP usually runs over a connection-oriented transport protocol, such as Transport Control Protocol (TCP). Using this transport connection, BGP routers may exchange BGP messages (i.e., update messages with announcements or withdrawals of Internet Protocol (IP) prefixes, keep alive messages, and the like) that allow them to create and update their routing tables. It should be noted that an IP prefix is an IP address associated with a mask of valid bits. For example, a prefix, 130.29.0.0/16, means only that the most significant 16 bits are valid.

In managing networks and network connections it is useful to monitor the routing tables. By analyzing the changes in the routing tables, the state of the network or networks may be determined. For example, when a communication link or a router stop operating in particular areas of the network, the prefixes with paths that include those failed networking elements may be withdrawn or deleted from the routing tables. Routing tables may be monitored directly using Simple Network Management Protocol (SNMP), Telnet, and/or peer sessions directly with the monitored router. A user may then access the routing information from the monitored router either directly through the SNMP/Telnet connections or indirectly through a Web server. The Web server generally obtains the routing information from the SNMP/Telnet session but presents the information through a Web access point. Web access is typically implemented as "Looking Glass" software applications that provide a "looking glass" into the routing table of the target router. Because the monitoring entity does not establish a direct connection to the router, Web server access generally provides a much more securable means for viewing the routing information than SNMP/Telnet. Therefore, SNMP/Telnet access is typically limited to trusted users.

Internet Service Providers (ISPs) generally maintain AS that may be further interconnected with various other AS. Public exchange points are the areas where multiple such ISPs exchange routing and traffic information through routers along the edges of the AS, referred to as edge routers. Historically, each edge router exchanges the routing information with each other edge router both within its AS and within the bordering AS. This process leads to many BGP sessions/connections to be made between the edge servers. The set of these connections is referred to as the BGP mesh. Because each router would typically need to connect with each other router, $R^2$ BGP connections generally result, where R is the total number of routers in the mesh. One method that has been implemented to overcome the complexity of this BGP mesh is to deploy route servers (RS).

An RS is a software application running on a router or another computer connected to the network that communicates and exchanges route information with the AS' edge servers. Under the RS' routing policies, routing information may be exchanged with any other requesting router, including routers of the neighboring AS that are provided for in the routing policy. By providing the more centralized access point for exchanging and obtaining routing information, the number of connections or BGP sessions is substantially reduced. Instead of $R^2$ BGP connections/sessions, because each router only needs to connect with the RS, there is typically only R connections/sessions. Using an RS also generally allows the user to capture a more complete picture of the BGP updates instead of a mere snapshot of the routing information base (RIB) that is obtained through the direct access methods. RS are typically deployed at the edges of the AS, where communication may occur with routers external to the known network.

Another means for centralizing access to routing information is using a Route Reflector (RR). Like an RS, an RR is a software application running on a router or another computer connected to the network that communicates and exchanges route information. However, RR do not generally have routing policies that dictate which requesting routers or entities can or cannot access the routing information. RR basically repeats all of the routing information that it has to any accessing entity. RR are primarily used to reduce the mesh within AS, while RS are generally used to allow exchange routing information between multiple AS.

The problem with the current techniques is that they each require a BGP session with the monitored router, RS, and/or RR. Establishing and running a BGP session with the monitored router drains the monitored router's central processing unit (CPU) cycles. A router's performance generally degrades as the number of open BGP sessions increases. Therefore, because an RS is typically configured as a peer in every monitored router's configuration file, these techniques are generally not very well-suited for passively monitoring routing information. The establishment of such BGP sessions is very invasive creating a management problem for the routers. In addition, if, for some reason, overloaded RS begin crashing, the monitoring routers attempt to reestablish the BGP sessions. Reestablishing the BGP sessions causes extensive updates to occur because the monitored router sends all of its routing information to the RS again. For edge routers, this updating may result in the monitored router sending over 100,000 prefixes to the RS.

Additionally, gathering routing information in a session between the monitoring system and the monitored router only gathers the information that relates to the connection between those two devices. If a BGP session between a monitored router and another router goes down, there is generally no way to determine what caused the failure. As the BGP session goes down, the monitored session may provide a flood of withdraw signals, as well as multiple announcements of IP prefixes arriving as a result of a BGP session going down. However, there is no way to determine whether the problem is with the TCP session or BGP session. Additionally, the monitored system maybe overloaded causing the system to stop sending "keep alive" message to monitored router. Ceasing the "keep alive" messages may then cause a BGP session reset by the monitored router resulting again in a flood of prefix announcements when the BGP session is reestablished, as discussed above. Consequently, the announcements caused by reestablishing the BGP session may lead to further overloading of other monitored stations/routers. Overstressed monitored stations could then cause BGP sessions to fail with other monitored routers creating a domino effect of reestablishing multiple BGP sessions.

Many current monitoring systems utilize public domain routing software, such as Zebra, to obtain and monitor routing information. Zebra is a routing software that captures BGP traffic via established BGP sessions with monitored routers and reconstructs routing tables based on provided routing information. Zebra may be used to implement a router, RS, or RR; therefore, it leverages that functionality to obtain the routing information. Zebra may establish BGP sessions with one or more of the routers, route servers, or Route Reflectors and obtain routing information. Thus, monitoring the router using Zebra also decreases the efficiency of that router.

Additional means for gathering routing information have been employed using line taps or packet sniffers. Taps and sniffers are devices that actually tap into a communication line between two or more routers. These devices essentially eavesdrop on the communication taking place between different routers. Such tapping methods typically capture the routing information and display it as formatted BGP data. Similar tapping methods are used in Network Intrusion Detection Systems (NIDS), which use sophisticated analysis engines to detect system attacks/intrusions including attacks made at the BGP level. While such tapping/sniffing methods allow for passively capturing or recovering routing information without establishing a BGP session with the monitored routers, issues such as data security and ability to trap and compile information for all of the data passing through the communications lines arise.

BRIEF SUMMARY OF THE INVENTION

Representative embodiments of the present invention relate to a routing monitor comprising at least one communication tap, wherein each of the at least one communication taps is positioned in a line of communication between two routers and a protocol emulator for reassembling routing protocol messages captured by the at least one communication tap and establishing a routing protocol session with a network monitoring device using the reassembled routing protocol.

Additional representative embodiments of the present invention relate to a method for monitoring routing information in a network comprising tapping into a communication line between two network routers, replicating packets transmitted on the communication line between the two network routers, transmitting the replicated packets to a session emulator, reconstructing routing protocol messages from the replicated packets, and establishing a routing protocol session with a network monitoring device.

Further representative embodiments of the present invention relate to a computer program product having a computer readable medium with computer program logic recorded thereon, the computer program product comprising code for re-assembling routing protocol messages received from an eavesdropping device between two routers and code for emulating a routing protocol session with a network monitoring device.

BRIEF DESCRIPTION OF THE DRAWINGS

FIG. 1 is a block diagram illustrating a network constructed having a route server providing routing information on communication between two servers to a looking glass Web server;

FIG. 2 is a block diagram illustrating a network with a network monitor configured according to one embodiment of the present invention;

DETAILED DESCRIPTION

Figure 3:
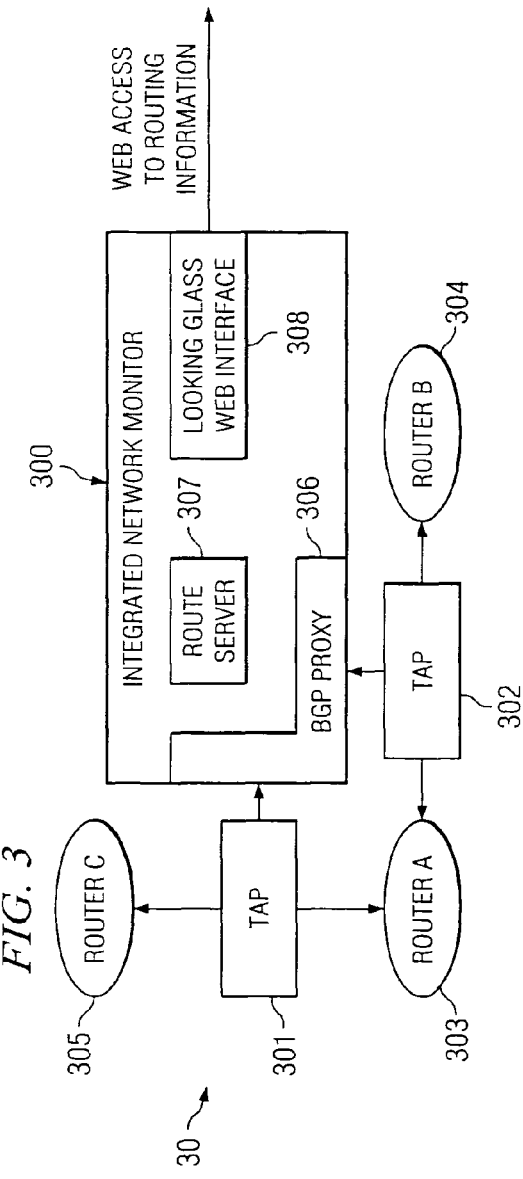
FIG. 3 is a block diagram illustrating an additional embodiment of the present invention monitoring routers.

FIG. 1 is a block diagram illustrating network 10 constructed having route server 100 providing routing information on router 101 and router 102 to looking glass Web server 103. As shown in FIG. 1, router 101 and 102 establish BGP sessions with route server 100 in order to send its routing information. Looking glass Web server 103 is then able to provide users access to the routing information collected and stored on route server 100. Therefore, in addition to the processing cycles that routers 101 and 102 use to perform routing between themselves and any other peering router, routers 101 and 102 expend additional processing cycles connecting and communicating with route server 100, thus, decreasing their overall efficiency.

FIG. 2 is a block diagram illustrating network 20 with network monitor 200 configured according to one embodiment of the present invention. Unlike the system in network 10, network monitor 200 monitors the communication between routers 201 and 202 through TAP 203 without requiring a separate BGP session/connection with either or both of routers 201 and 202.

Similarly to network 10, network 20 is configured with route server 205 providing access to the routing information via Looking Glass Web server 206. However, as TAP 203 eavesdrops on the data packets being communicated between peering routers 201 and 202, BGP proxy 204 reassembles the TCP connection information and the BGP session data and updates therein, and then emulates a BGP session with route server 205 using the BGP sessions information trapped from the communication between peering routers 201 and 202. Thus, route server 205 believes that it is physically in communication with both of routers 201 and 202, without there being an actual drain on routers 201 and 202's processor resources.

It should be noted that typical RS generally listen to one well-known port (usually port 179). However, embodiments of the present invention may generally operate with RS that are capable of listening on multiple different ports. This allows the RS to maintain simultaneous connections with multiple BGP session streams emulated from a BGP proxy, such as BGP proxy 204 shown in FIG. 2. Similarly, BGP proxies configured according to various embodiments of the present invention may use network interface cards (NIC) that support multiple addresses or establishing multiple TCP connections on different ports.

Although FIG. 2 illustrates an embodiment of the present invention monitoring a single peering session, additional embodiments of the present invention may monitor any desired number of peering sessions. FIG. 3 is a block diagram illustrating an additional embodiment of the present invention monitoring routers 303-305. Integrated network monitor 300 includes BGP proxy 306, route server 307, and Looking Glass Web interface 308. Such an integrated embodiment may provide a compact form. TAP 301 taps into the peering communication session between routers 303 and 305 and transmits the captured routing information to integrated network monitor 300. TAP 302 taps into the peering communication session between routers 303 and 304 and also transmits the captured/copied routing information to integrated network monitor 300.

The various embodiments of the present allow wider deployment of router monitoring devices because they teach non-invasive information capturing and may not require router configuration changes. Furthermore, because no extra BGP sessions are set up between the monitored routers and the monitoring system, no extra CPU cycles are used in the monitored routers.

An additional by-product of the embodiments of the present invention is that it allows for detection of router attacks. Current monitor methods typically do not show scans or attacks against routing protocols because routers typically discard such unexpected data packets with their routing protocol messages unless a complex, extremely CPU intensive debugging process is activated. However, because the embodiments of the present invention generally capture all of the data packets in the communication sessions between routers, the various embodiments of the network monitor may then be capable of logging routing information from such unexpected origination or destination addresses that would otherwise be discarded by the monitored router.

Figure 4:
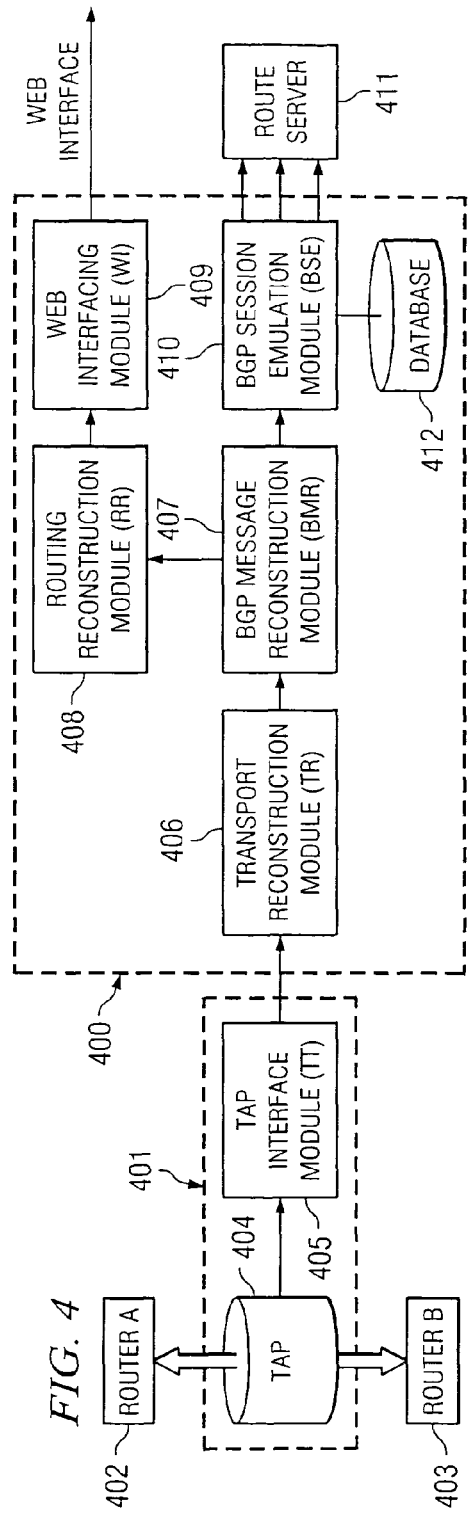
FIG. 4 is a block diagram detailing a network monitor system configured according to an embodiment of the present invention.

FIG. 4 is a block diagram detailing network monitor system 40 configured according to an embodiment of the present invention. Tapping module 401 includes a physical interface tap, TAP 404, and TAP Interface (TI) module 405. TI module 405 captures traffic using TAP 404, which may be a physical line tap or a built in means, such as a mirroring port, and filters out non-routing information. It should be noted here that mirroring ports of existing routers/switches typically copy all traffic and therefore may have problems keeping up with the received levels of traffic because aggregate traffic volume is generally higher than mirroring port capacity. Today, capturing traffic at a speed of up to 100 Mbit/sec could be problematic. It is important, therefore, that, in select embodiments of the present invention, TAP 404 have real-time filtering and forwarding capabilities.

BGP data directed to the monitored router's IP address is forwarded to Transport Reconstruction (TR) module 406 of network monitor 400 for transport session data reconstruction. TR module 406 reconstructs TCP data streams and deals with packets that are out of order, packet retransmissions, and the like, in a timely fashion, i.e., it cannot wait indefinitely when a packet is missing. TR module 406 should handle packets missed by the TAP because the apparatus is non-intrusive and, therefore, cannot request retransmission of a missing packet. It should be noted here that BGP uses a maximum packet size of 4 kBytes while media such as Ethernet generally allows payloads of less than 1.5 kBytes. In such cases, 4 kB BGP messages may be fragmented into smaller IP packets. TI module 405 should have the capability to filter data packets based on filter attributes, such as IP address, protocol IDs, and destination ports. If the filter values of a captured packet matches a previously user-configured filters, the packet is forwarded to TR module 406; otherwise it is dropped. The TI module 405 reduces data traffic to the data needed for reconstructing TCP sessions associated with the exchange of routing information. This is to provide a scaleable solution for high-speed links. It should be noted here that some of the traffic destined to a particular router may not carry routing information, such as SNMP or Telnet. This data may be either dropped at TI module 405 or at TR module 406 depending on the sophistication of TI module 405's filtering capability. In such cases, TI module 405 may also filter based on a particular TCP port.

In additional implementations, TI module 405's functionality may reside in a separate element that also houses TAP 404. TAP 404 may also aggregate multiple physical TAP's serving each individual interface on the router's line card as disclosed in commonly assigned, co-pending patent application Ser. No. 10/407,719, entitled, "ASSISTED PORT MONITORING WITH DISTRIBUTED FILTERING." As previously discussed, TR module 406 may also detect intrusions. If, for example, a router typically accepts only TCP connections from specifically configured routers (peers) and usually drops other competing TCP connection attempts that are directed to BGP port 179 without logging those attempts. Unless the router's configuration enables specific debugging/logging, such attempts will not be observed. TR module 406 could be configured to accept only traffic destined for the previously configured, monitored routers' IP addresses and log any other attempts to establish connection. Screening and logging of TCP/IP traffic at this level could be even more detailed than when this is done by the router itself. It should be noted that the reconstruction of the transport protocol should take care of missing, and later retransmitted packets and out of order packets that may occur especially when dealing with multi-hop BGP, i.e., when other routers separate the peering routers.

TR module 406, after reconstructing part of the TCP data stream, passes data to BGP Message Reconstruction (BMR) module 407 to assemble the BGP message and ensures that is complete. Incomplete messages may be logged locally as missing or malformed BGP messages. Depending on configuration of the apparatus, BMR 407 forwards the BGP message either to Routing Reconstruction (RR) module 408 or BGP Session Emulation (BSE) module 410. RR module 408 may be used when the apparatus provides an integrated solution and builds a Routing Information Base (RIB) according to RFC 1771. The snapshots of the RIB, as well as time stamped BGP update information, may be stored in local disk 412. In this case, the invention may work as a RS that, via Web Interface (WI) module 408, provides routing information to Web users as Looking Glass Applications do today. In the case where the invention provides a BGP proxy solution, BMR module 407 forwards the reconstructed BGP messages to BSE module 410. Reconstructed BGP messages coming from a specific monitored router are then sent over a specific peering session that is established with external route server 411 or replicated into multiple peering sessions if more than one route server is interested in receiving the routing information of a specific router. BSE module 410 may use either different IP addresses when talking to a specific RS or different TCP ports at the RS to distinguish between different peering sessions representing different monitored routers.

The BGP session information includes time stamps that get recorded in addition to the BGP update information into local disk 412. Unlike Zebra, which must break off the BGP session to save any BGP information is has, the reconstructed BGP updates with all of the time stamps accurately recorded thereon are stored into local disk 412. Therefore, two conflicting updates may be resolved by embodiments of the present invention by comparing time stamps and knowing that there were no interim updates that occurred when Zebra would have been storing its data.

What is claimed is:

1. A routing monitor comprising:
   at least one communication tap, wherein each of said at least one communication taps is positioned in a line of communication between two routers;
   a protocol emulator for reassembling routing protocol messages captured by said at least one communication tap and establishing a routing protocol session with a network monitoring device using said reassembled routing protocol messages; and
   a transport protocol module in communication with said at least one communication tap,
   wherein said transport protocol module reassembles transport protocol messages captured by said at least one communication tap, and
   wherein said protocol emulator opens a transport protocol connection and establishes the routing protocol session with said network monitoring device using said reassembled transport protocol messages.

2. The routing monitor of claim 1 further comprising:
   a Web server, wherein said Web server converts said reassembled routing protocol messages into a Web accessible format; and
   a Web interface for displaying said reassembled routing protocol messages in said Web accessible format.

3. The routing monitor of claim 1 wherein said at least one communication tap comprises one of:
   a mirroring port on at least one of said two routers; and
   a line tap device.

4. The routing monitor of claim 1 wherein said at least one communication tap comprises:
   a line tap device; and
   a tap interface module (TIM) between said line tap device and said protocol emulator, wherein said TIM filters messages intercepted by the line tap device according to filter attributes.

5. The routing monitor of claim 4 wherein said filter attributes comprise one or more of:
   Internet Protocol (IP) addresses;
   protocol identification; and
   destination port.

6. The routing monitor of claim 1 further comprising:
   a routing reconstruction module for building a routing information base (RIB) using said reassembled routing protocol messages.

7. The routing monitor of claim 1 further comprising:
   a table reconstruction module for building a routing table using said reassembled routing protocol messages.

8. The routing monitor of claim 6 further comprising:
   a Web server, wherein said Web server converts said RIB into a Web accessible format; and
   a Web interface for displaying said RIB in said Web accessible format.

9. The routing monitor of claim 1 wherein said protocol emulator comprises:
   a routing protocol reconstruction module for reassembling said captured routing protocol messages; and
   a protocol session emulator for establishing the routing protocol session to said network monitoring device and by transmitting appropriate ones of said reassembled routing protocol messages to said network monitoring device.

10. The routing monitor of claim 1 wherein said protocol emulator and said network monitoring device are located in a single device.

11. The routing monitor of claim 2 wherein said protocol emulator, said network monitoring device, and said Web server are located in a single device.

12. The routing monitor of claim 1 wherein said routing protocol comprises one of:
   Border Gateway Protocol (BGP);
   Routing Information Protocol (RIP);
   Open Shortest Path First Protocol (OSPF); and
   Intermediate System to Intermediate System (ISIS) protocol.

13. A method for monitoring routing information in a network comprising:
   tapping into a communication line between two network routers;
   replicating packets transmitted on said communication line between said two network routers;
   transmitting said replicated packets to a session emulator;
   reconstructing routing protocol messages from said replicated packets with a protocol emulator; and
   establishing a routing protocol session with a network monitoring device.

14. The method of claim 13 further comprising:
   converting said reconstructed routing protocol messages into a Web compatible format; and
   displaying said converted routing protocol messages on a Web interface.

15. The method of claim 13 further comprising:
   filtering said replicated packets according to one or more of:
   Internet Protocol (IP) addresses;
   protocol identification; and
   destination port.

16. The method of claim 13 further comprising:
   reconstructing transport protocol messages from said replicated packets; and
   establishing a transport protocol session with said network monitoring device.

17. The method of claim 13 further comprising:
   constructing a routing information base (RIB) using said reconstructed routing protocol messages;
   converting said RIB into a Web compatible format; and
   displaying said converted RIB on a Web interface.

18. The method of claim 13 further comprising:
   constructing a routing table using said reconstructed routing protocol messages.

19. A computer program product having a computer readable medium with computer program logic recorded thereon, said computer program product comprising:

code for communicating with an eavesdropping device between two routers and for re-assembling routing protocol messages received from the eavesdropping device; and code for opening a transport protocol connection and emulating a routing protocol session with a network monitoring device using the re-assembled transport protocol messages.

20. The computer program product of claim 19 further comprising:

code for displaying said re-assembled routing protocol messages on a Web interface.

21. The computer program product of claim 19 further comprising:

code for constructing a routing table using said re-assembled routing protocol messages.

22. The computer program product of claim 19 further comprising:

code within said eavesdropping device for filtering said routing protocol messages are filtered according to one or more of:

Internet Protocol (IP) addresses;
protocol identification; and
destination port.

23. The computer program product of claim 19 further comprising:

code for reconstructing transport protocol messages received from said eavesdropping device between said two routers; and code for emulating a transport protocol session with said network monitoring device.

24. The routing monitor of claim 1, wherein the routing protocol messages are captured by said at least one communication tap without establishing any session between the routing monitor and either of the two routers.

25. The method of claim 13, wherein the method does not establish any session with either of the two routers.

26. The computer program product of claim 19, wherein the computer program product does not include any code for establishing any session with either of the two routers.

* * * * *